(12) United States Patent
Sheaffer

(10) Patent No.: US 7,293,056 B2
(45) Date of Patent: Nov. 6, 2007

(54) VARIABLE WIDTH, AT LEAST SIX-WAY ADDITION/ACCUMULATION INSTRUCTIONS

(75) Inventor: Gad Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 10/321,573

(22) Filed: Dec. 18, 2002

(65) Prior Publication Data

US 2004/0123076 A1   Jun. 24, 2004

(51) Int. Cl.
*G06F 7/509* (2006.01)

(52) U.S. Cl. .................................... 708/709

(58) Field of Classification Search ............... 708/709; 712/221
See application file for complete search history.

(56) References Cited

U.S. PATENT DOCUMENTS

| | | | | |
|---|---|---|---|---|
| 3,675,001 A | * | 7/1972 | Singh | 708/709 |
| 5,978,827 A | * | 11/1999 | Ichikawa | 708/709 |
| 6,122,725 A | * | 9/2000 | Roussel et al. | 712/200 |
| 2003/0159022 A1 | * | 8/2003 | Kondoh | 712/221 |
| 2003/0188134 A1 | * | 10/2003 | Sheaffer | 712/221 |

* cited by examiner

*Primary Examiner*—D. H. Malzahn
(74) *Attorney, Agent, or Firm*—Kenyon & Kenyon LLP (57) ABSTRACT

The present invention relates to a method and system for providing a variable width, at least six-way addition instruction in a processor. The method includes decoding an instruction as a variable width, at least six-way addition instruction, where the variable width, at least six-way addition instruction includes a plurality of operands. The method also includes adding the plurality of operands to obtain a plurality of sums. The method further includes outputting the plurality of sums and optionally storing carry results from the adding operation.

6 Claims, 7 Drawing Sheets

VARIABLE WIDTH, AT LEAST SIX-WAY ADDITION/ACCUMULATION INSTRUCTIONS

FIELD OF THE INVENTION

The present invention relates to processor architectures and instruction sets, and in particular, to processor architectures with instruction sets that provide variable width, at least six-way addition or accumulation instructions.

BACKGROUND

In modern processors execution of instructions occurs, in general, in the following sequential order: the processor reads an instruction, a decoder in the processor decodes the instruction, and, then, the processor executes the instruction. In older processors the clock speed of the processor was generally slow enough that the reading, decoding and executing of each instruction could occur in a single clock cycle. However, modern microprocessors have improved performance by going to shorter clock cycles (that is, higher frequencies). These shorter clock cycles tend to make instructions require multiple, smaller sub-actions that can fit into the cycle time. Executing many such sub-actions in parallel, as in a pipelined and/or super-scalar processor, can improve performance even further. For example, although the cycle time of a present-day processor is determined by a number of factors, the cycle time is, generally, determined by the number of gate inversions that need to be preformed during a single cycle. Ideally, the execute stage determines the cycle time. However, in reality, this is not always the case. With the desire to operate at high frequency, the execute stage can be performed across more than one cycle, since it is an activity that can be pipelined. In a large number of workloads the added latency caused by the additional cycle(s) has only a small impact on processor performance. The ultimate goal of many systems is to be able to complete the execution of as many instructions as quickly and as efficiently as possible without adversely impacting the cycle time of the processor.

One way to increase the number of instructions, or equivalent instructions, that can be executed is to create single instructions that can perform work that currently can only be accomplished by using multiple instructions without causing any timing problems during the execute phase. Instructions of this type can be especially effective in performing multi-way additions.

DETAILED DESCRIPTION

In accordance with an embodiment of the present invention, multi-way addition instructions may be implemented to execute in one or more cycles using, for example, 3:1 adders in each pipe stage. Each 3:1 adder may add three values and output a single value. The instruction may operate in a fully pipelined manner (that is, with a throughput of one (1) instruction every cycle) and produce a result after two (2) cycles. The special purpose registers, definitions of which are specified below, merely illustrate one possible embodiment of the present invention and should not be construed as the only possible embodiment.

In accordance with an embodiment of the present invention, the basic hardware that may be used by the multi-way addition instructions may include 8-bit and 16-bit adders, which may be fitted easily in a single cycle of any processor. This is especially true if the processor on which the instructions are running operates on higher precision data types such as 64-bit integers and floating point numbers. For example, since the 3:1 adders are only marginally slower than a 2:1 adder and only involve single carry propagation, two (2) 3:1, 16-bit adders may be implemented in two (2) consecutive execute stages without impacting the cycle time of the processor.

In addition, implementing the whole operation in a single instruction may provide a significant savings in the pipeline front-end instruction supply requirements, since the functionality of multiple instructions may be packed into a single instruction without causing any timing problems during the execute stage.

The impact of the multi-way addition instructions on overall performance can be significant. For example, in accordance with an embodiment of the present invention, an N-wide, six-way (6-way) addition or accumulation instruction may reduce the latency required for performing the same operation with current instructions by a factor of 3 to 4, thus, enabling a significant speedup of applications using the N-wide, 6-way addition instruction. In general, N may be greater than or equal to two (N≧2). Similarly, in accordance with an embodiment of the present invention, an N-wide, seven-way (7-way) addition instruction may also reduce the latency required for performing the same operation with current instructions by a factor of 3 to 4, thus, enabling a significant speedup of applications using the N-wide, multi-way addition/accumulation instructions. As with the N-wide, 6-way addition or accumulation instructions, N≧2 for the N-wide, 7-way addition instruction. Specifically, the N-wide, multi-way addition/accumulation instructions may enable significant speedup of the execution of a large class of applications, for example, applications for modems, speech and video.

Figure 1:
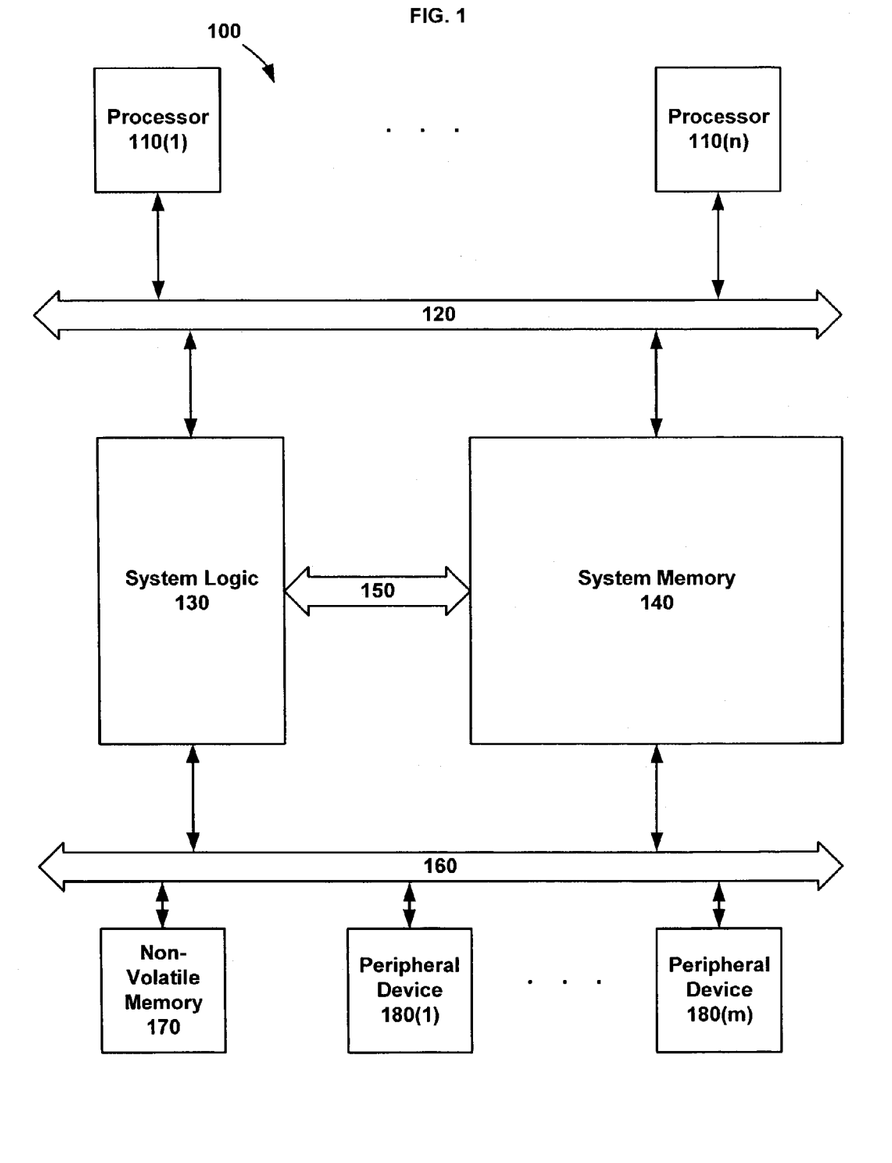
FIG. 1 is a block diagram of a computer system that includes an architectural state including one or more processors, registers and memory, in accordance with an embodiment of the present invention.

FIG. 1 is a block diagram of a computer system, which includes an architectural state, including one or more processors, registers and memory, in accordance with an embodiment of the present invention. In FIG. 1, a computer system 100 may include one or more processors 110(1)-110(n) coupled to a processor bus 120, which may be coupled to a system logic 130. Each of the one or more processors 110(1)-110(n) may be N-bit processors and may include a decoder (not shown) and one or more N-bit registers (not shown). System logic 130 may be coupled to a system memory 140 through a bus 150 and coupled to a non-volatile memory 170 and one or more peripheral devices 180(1)-180(m) through a peripheral bus 160. Peripheral bus 160 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 170 may be a static memory device such as a read only memory (ROM) or a flash memory. Peripheral devices 180(1)-180(m) may include, for example, a keyboard; a mouse or other pointing devices; mass storage devices such as hard disk drives, compact disc (CD) drives, optical disks, and digital video disc (DVD) drives; displays and the like.

Figure 2:
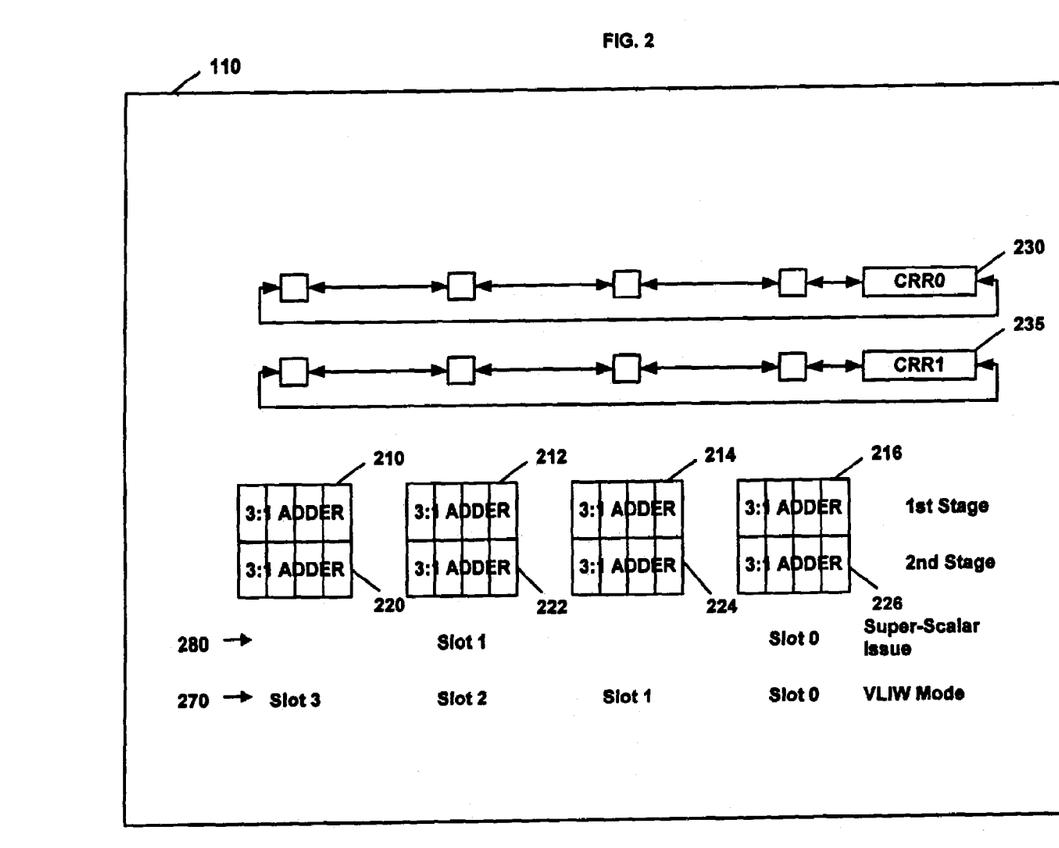
FIG. 2 is an exemplary structure of a processing core of the computer of FIG. 1 having a super-scalar architecture and/or Very Long Instruction Word (VLIW) architecture with multiple 3:1 address implemented in 2 consecutive execute stages for performing multi-way addition and/or accumulation instructions, in accordance with an embodiment of the present invention.

FIG. 2 is an exemplary structure of a processor 110 of the computer of FIG. 1 having a super-scalar architecture and/or Very Long Instruction Word (VLIW) architecture with multiple 3:1 adders 210, 212, 214, 216, 220, 222, 224 and 226 implemented in two (2) consecutive execute stages for performing multi-way additions, in accordance with embodiments of the present invention. It should be clearly understood that the exemplary structure shown in FIG. 2 is merely illustrative of the larger inventive concept and should not be taken to limit the possible structural combinations of the present invention. For example, in six-way (6-way) addition and/or accumulation instructions, which may have 2 stages; there may be four (4) 3:1 adders 210, 212, 214 and 216 in a first stage; four (4) 3:1 adders 220, 222, 224 and 226 in a second stage; and at least one (1) compare result register (CRR) 230, 235. Similarly, for example, in seven-way (7-way) addition instructions, which may have 2 stages; there also may be four (4) 3:1 adders 210, 212, 214 and 216 in a first stage; four (4) 3:1 adders 220, 222, 224 and 226 in a second stage; and at least one (1) CRR 230, 235. However, executing each of the 6-way and 7-way instructions may not need to use all of adders 210, 212, 214, 216, 220, 222, 224 and 226 and/or CRRs 230 and 235. Therefore, although not required to execute either of the 6-way and 7-way instructions, all of the adders are merely representative of an embodiment of the present invention.

In FIG. 2, processor 110 also may include several common registers including, for example, CRR0 230 and CRR1 235. CRR0 230 and CRR1 235 may be implemented as shift-registers into which all the arithmetic flags generated in a cycle may be shifted. Although CRR0 230 may not be used in embodiments of the present invention, and processor 110 may also be implemented with a single CRR, CRR0 230 is shown for consistency. If more than one instruction causing a shift is issued to one of the CRR registers, for example CRR1 235 in the same cycle, CRR 235 may be shifted by the sum of the number of instructions causing the shifts. For example, a carryout bit from the second stage 3:1 adders may be stored in CRR1 235.

For example, in the present embodiment, all of the instructions consuming the contents of one of CRR1 235 may conditionally shift CRR1 235 after reading the relevant bits out of CRR1 235. In contrast, all of the instructions modifying CRR1 235 may shift the bits of CRR1 235 before updating CRR1 235. For example, in accordance with an embodiment of the present invention, CRR1 235 may be used for collecting flags generated by the second stage of execution, and for providing flags to the second execution stage.

The 6-way and 7-way addition instructions may update the CRR bits based on the issue slot in which the instruction is executed. For example, for an instruction number, I, I may be $\in \{0,1\}$ in Super-scalar mode, and I may be $\in \{0,1,2,3\}$ in VLIW mode, where only the VLIW and Super-scalar adder issue slots 270 and 280 are considered.

In order to minimize the amount of connectivity required to steer bits into and out of CRR1 235, the instructions using CRR1 235, in general, may be packed into the lower issue slots. This means that if N such instructions are issued, they would occupy issue slots 0 to N-1. This restriction, generally, can be easily enforced in VLIW mode, for example, in the four (4) issue slots 270 in FIG. 2. Unfortunately, in super-scalar mode it can be harder to enforce, and occasionally may cause the processor 110 to stall. However, in FIG. 2, in super-scalar mode, if there are only two (2) issue slots 280, it may be easier to provide the required connectivity to enable issuing a single instruction using these registers into slot 1 rather than slot 0.

The 6-way and 7-way addition instructions may be described in the context of the processor 110 having a Super-Scalar architecture and/or a VLIW architecture. For example, in accordance with an embodiment of the present invention, the data type may be assumed to be 16-bits and the processing core may be assumed to have a 32-bit data path and 32-bit registers. However, it should be clearly understood that this example is merely illustrative and in no way intended to limit the scope of the present invention, since the data type and processing core may be of any other precision either below or the above 16-bit data type:32-bit processing core ratio, for example, 8-bit:32-bit, 16-bit:64-bit or 32-bit:128-bit.

In accordance with an embodiment of the present invention, a generalized 6-way addition and/or accumulation instruction may be implemented to add six (6) input values. For example, the 6-way addition instruction may add the 6 input values, optionally accumulate the results with the results of previous executions of the instruction, and optionally update a CRR register. Specifically, the generic syntax of the 6-way addition and/or accumulation instruction with six (6) input values may be represented by:

[CRR] dest$R$=src0+src1+src2+src3+src4+src5

[CRR] dest$R$+=src0+src1+src2+src3+src4+src5

[CRR] [acc] dest$R$=src0+src1+src2+src3+src4+src5 where the square brackets ([]) denote optional instruction parameters that are not required for execution of the instruction, CRR is a variable that controls whether the CRR registers are used to accumulate condition codes, and the "+=" operator and "acc" optional variable indicate whether the results of the instruction should be accumulated.

Setting the CRR variable to TRUE may cause the instruction to accumulate condition codes into at least one of the CRR registers, for example, in accordance with an embodiment of the present invention, the CRR1 register 235.

If the += operator is used and/or setting the acc option to TRUE may cause the instruction to accumulate the results with the results prior executions.

In accordance with an embodiment of the present invention, the six-way (6-way) addition instruction described below, generally, may be completely executed over two (2) processor clock cycles. However, it should be clearly understood that the instructions also may be implemented to be executed over a single clock cycle as well as over three (3) or more clock cycles. In the following examples, the syntax used may include variables such as signal' and signal", which are delayed versions of a variable signal by one and two cycles, respectively.

In accordance with an embodiment of the present invention, the functionality of the 6-way addition or accumulation instruction may be defined by the following C-style pseudo-code example which may be executed over one or more clock cycles:

```
First stage:
    out00 = src0.1 + src1.1 + src2.1
    out01 = src3.1 + src4.1 +src5.1
    out10 = src0.h + src1.h+src2.h
    out11 = src3.h + src4.h + src5.h
Second stage:
    If += OR acc {
    cout0 & sum0 = out00' + out01' + sum0'
    cout1 & sum1 = out10' + out11' + sum1'
    }
    else {
    cout0 & sum0 = out00' + out01'
    cout1 & sum1 = out10' + out11'
    }
    destR = (sum1, sum0)
    If CRR
    {
    CRR1[2i+1, 2i] = cout1 & cout0
    Shift CRR1 right by 2
    }
```

Figure 3:
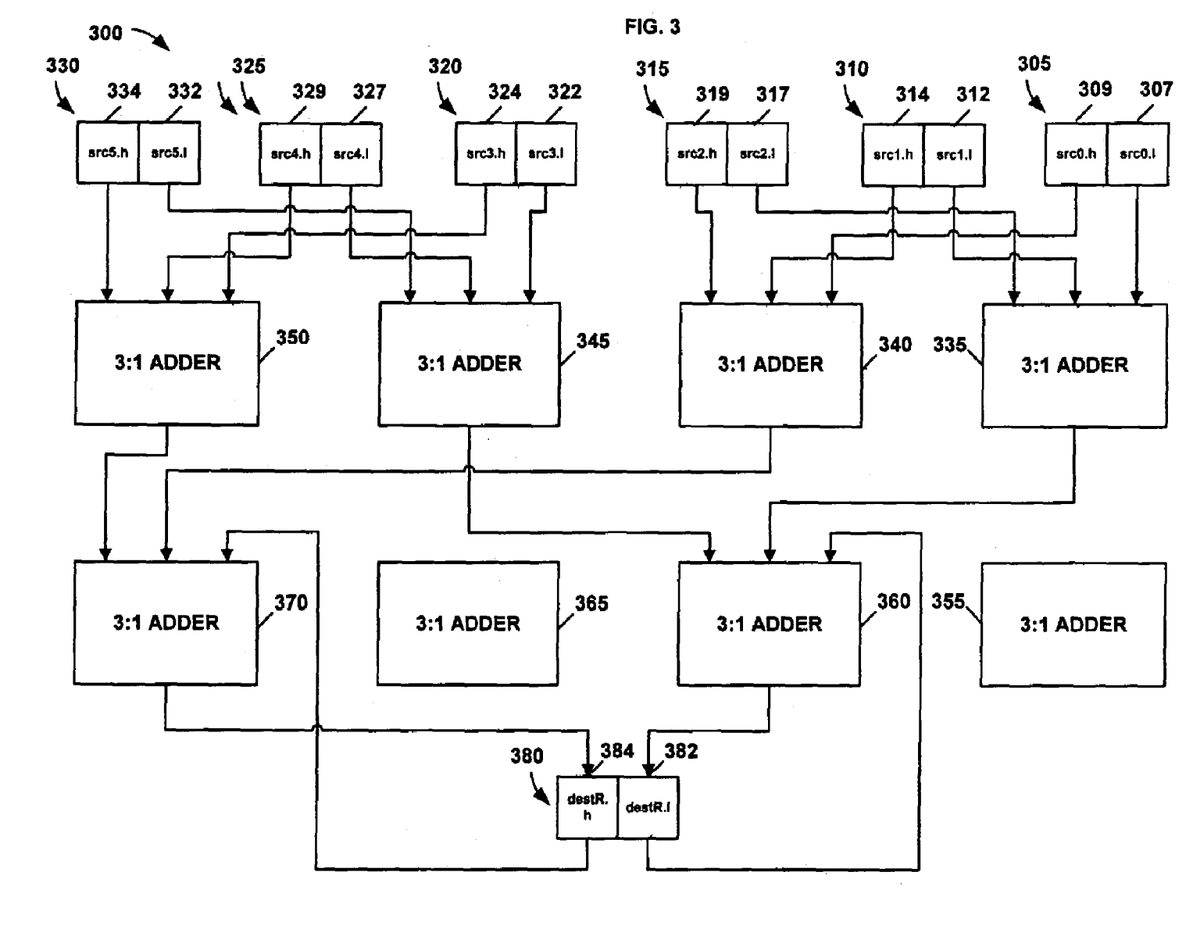
FIG. 3 is a detailed block diagram of a circuit for providing six-way (6-way) addition or accumulation instructions in a processor, in accordance with an embodiment of the present invention.

FIG. 3 is a detailed block diagram of a circuit for providing N-wide, six-way (6-way) addition or accumulation instructions in a processor, in accordance with an embodiment of the present invention. In FIG. 3, a circuit 300 includes a plurality of instruction operand storage locations 305, 310, 315, 320, 325 and 330; a plurality of 3:1 adders 335, 340, 345, 350, 355, 360, 365 and 370; and a destination register 380. A first instruction operand storage location 305 may include a first source operand low-bit storage location 307 coupled to a first input of a first adder 335 and a first source operand high-bit storage location 309 coupled to a first input of a second adder 340. A second instruction operand storage location 310 may include a second source operand low-bit storage location 312 coupled to a second input of first adder 335 and a second source operand high-bit storage location 314 coupled to a second input of second adder 340. A third instruction operand storage location 315 may include a third source operand low-bit storage location 317 coupled to a third input of first adder 335 and a third source operand high-bit storage location 319 coupled to a third input of second adder 340. A fourth instruction operand storage location 320 may include a fourth source operand low-bit storage location 322 coupled to a first input of a third adder 345 and a fourth source operand high-bit storage location 324 coupled to a first input of a fourth adder 350. A fifth instruction operand storage location 325 may include a fifth source operand low-bit storage location 327 coupled to a second input of third adder 345 and a fifth source operand high-bit storage location 329 coupled to a second input of fourth adder 350. A sixth instruction operand storage location 330 may include a sixth source operand low-bit storage location 332 coupled to a third input of third adder 345 and a sixth source operand high-bit storage location 334 coupled to a third input of fourth adder 350.

In FIG. 3, in accordance with an embodiment of the present invention, an output of first adder 335 may be coupled to a second input of a sixth adder 360, an output of second adder 340 may be coupled to a second input of an eighth adder 370, an output of third adder 345 may be coupled to a third input of sixth adder 360, and an output of fourth adder 350 may be coupled to a third input of eighth adder 370. An output of sixth adder 360 may be coupled to a destination operand low-bit storage location 382 of destination register 380 and an output of eighth adder 370 may be coupled to a destination operand high-bit storage location 384 of destination register 380. An output of destination operand low-bit storage location 382 may be coupled to a first input of sixth adder 360 and an output of destination operand high-bit storage location 384 may be coupled to a first input of eighth adder 370. The outputs of low-bit storage location 382 and high-bit storage location 384 coupled to adders 360 and 380 may be enabled if result accumulation has been specified in the instruction. Similarly, if result accumulation has not been specified in the instruction, the same outputs 382 and 384 may be disabled, which results in a null or zero value being placed on the first input lines of sixth adder 360 and eighth adder 370. Although fifth and seventh adders 355 and 365 may not be used in accordance with this embodiment of the present invention, other embodiments of the present invention are possible in which fifth and seventh adders 355 and 365 may be used.

In accordance with other embodiments of the present invention, dual 6-way, quad 6-way, octal 6-way and larger 6-way addition or accumulation instructions may be defined and, generally, may be completely executed over two (2) processor clock cycles. However, it should be clearly understood that the instructions also may be implemented to be executed over a single clock cycle as well as over three (3) or more clock cycles.

In accordance with an embodiment of the present invention, and similar to the 6-way addition or accumulation instruction, a 7-way sideways addition instruction may be implemented to add seven (7) input values. However, accumulation of the results is not an option in the 7-way sideways addition instruction. For example, the 7-way sideways addition instruction may add the 7 input values and optionally update a first CRR. Specifically, the generic syntax of the 7-way sideways addition instruction with 7 input values may be represented by:

[CRR] destR=SADD7(src0, src1, src2, src3, src4, src5, src6);

or

[CRR] destR=src0+src1+src2+src3+src4+src5+src6, where the square brackets ([]) denote optional instruction parameters that are not required for execution of the instruction and CRR is a variable that controls whether the CRR registers are used to accumulate condition codes.

In accordance with an embodiment of the present invention, the 7-way sideways addition instruction described below, generally, may be completely executed over two (2) processor clock cycles. However, it should be clearly understood that the 7-way sideways addition instruction also may be implemented to be executed over a single clock cycle as well as over three (3) or more clock cycles. In the following examples, the syntax used may include variables such as signal' and signal'', which are delayed versions of a variable signal by one and two cycles, respectively.

In accordance with an embodiment of the present invention, the 7-way sideways addition instruction may be defined by the following C-style pseudo-code example, which may be executed over one or more clock cycles:

```
First stage:
    out0 = src0.1 + src0.h + src1.1
    out1 = src2.1 + src2.h + src3.1
    out2 = src3.h + src4.1 + src4.h
    out3 = src5.h + src6.1 + src6.h
Second stage:
    cout0 & sum0 = out1' + src1'.h + out0'
    cout1 & sum1 = out3' + src5'.1 + out2'
    destR = (sum1, sum0)
    If CRR
    {
        CRR1[2i + 1, 2i] = cout1 & cout0
        Shift CRR1 right by 2
    }
```

Figure 4:
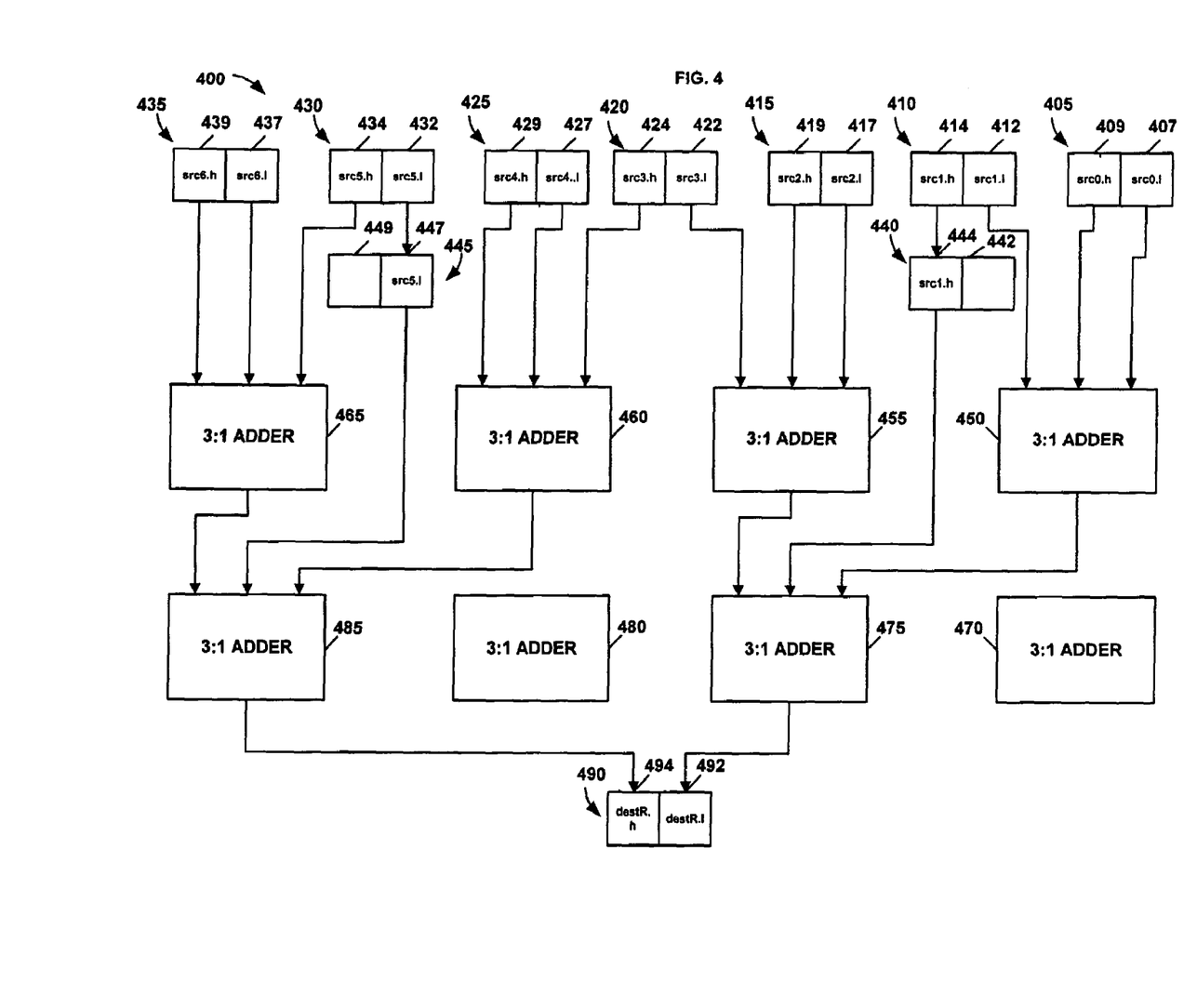
FIG. 4 is a detailed block diagram of a circuit for providing seven-way (7-way) sideways addition instructions in a processor, in accordance with an embodiment of the present invention.

FIG. 4 is a detailed block diagram of a circuit for providing the seven-way (7-way) sideways addition instruction in a processor, in accordance with an embodiment of the present invention. In FIG. 4, a circuit 400 includes a plurality of instruction operand storage locations 405, 410, 415, 420, 425, 430, 435, 440 and 445, where storage locations 440 and 445 may be used to temporarily latch source operands that may not be used in the first stage additions; a plurality of 3:1 adders 450, 455, 460, 465, 470, 475, 480 and 485; and a destination register 490. A first instruction operand storage location 405 may include a first source operand low-bit storage location 407 coupled to a first input of a first adder 450 and a first source operand high-bit storage location 409 coupled to a second input of first adder 450. A second instruction operand storage location 410 may include a second source operand low-bit storage location 412 coupled to a third input of first adder 450 and a second source operand high-bit storage location 414 coupled to a high-bit storage location 444 of a first intermediate operand storage location 440. In accordance with an embodiment of the present invention, a low-bit storage location 442 of first intermediate operand storage location 440 may remain unused. A third instruction operand storage location 415 may include a third source operand low-bit storage location 417 coupled to a first input of a second adder 455 and a third source operand high-bit storage location 419 coupled to a second input of second adder 455. A fourth instruction operand storage location 420 may include a fourth source operand low-bit storage location 422 coupled to a third input of second adder 455 and a fourth source operand high-bit storage location 424 coupled to a first input of a third adder 460. A fifth instruction operand storage location 425 may include a fifth source operand low-bit storage location 427 coupled to a second input of third adder 460 and a fifth source operand high-bit storage location 429 coupled to a third input of third adder 460. A sixth instruction operand storage location 430 may include a sixth source operand low-bit storage location 432 coupled to a second intermediate operand storage location 447 of second intermediate operand storage location 445 and a sixth source operand high-bit storage location 434 coupled to a first input of a fourth adder 465. In accordance with an embodiment of the present invention, a high-bit storage location 449 of second intermediate operand storage location 445 may remain unused. A seventh instruction operand storage location 435 may include a seventh source operand low-bit storage location 437 coupled to a second input of fourth adder 465 and a seventh source operand high-bit storage location 439 coupled to a third input of fourth adder 465.

In FIG. 4, in accordance with an embodiment of the present invention, an output of first adder 450 may be coupled to a first input of a sixth adder 475, an output of the high-bit storage location 444 of the first intermediate operand storage location 440 may be coupled to a second input of sixth adder 475, and an output of second adder 455 may be coupled to a third input of sixth adder 475. Similarly, in FIG. 4, an output of third adder 460 may be coupled to a first input of eighth adder 485, an output of the low-bit storage location 447 of the second intermediate operand storage location 445 may be coupled to a second input of eighth adder 485, and an output of fourth adder 465 may be coupled to a third input of eighth adder 485. An output of sixth adder 475 may be coupled to a destination operand low-bit storage location 492 and an output of eighth adder 485 may be coupled to a destination operand high-bit storage location 494. Although fifth and seventh adders 470 and 480 may not be used in accordance with this embodiment of the present invention, other embodiments of the present invention are possible in which fifth and seventh adders 470 and 480 may be used.

In accordance with other embodiments of the present invention, dual 7-way, quad 7-way, octal 7-way and larger 7-way sideways addition instructions may be defined and, generally, may be completely executed over two (2) processor clock cycles. However, it should be clearly understood that the instructions also may be implemented to be executed over a single clock cycle as well as over three (3) or more clock cycles.

Figure 5:
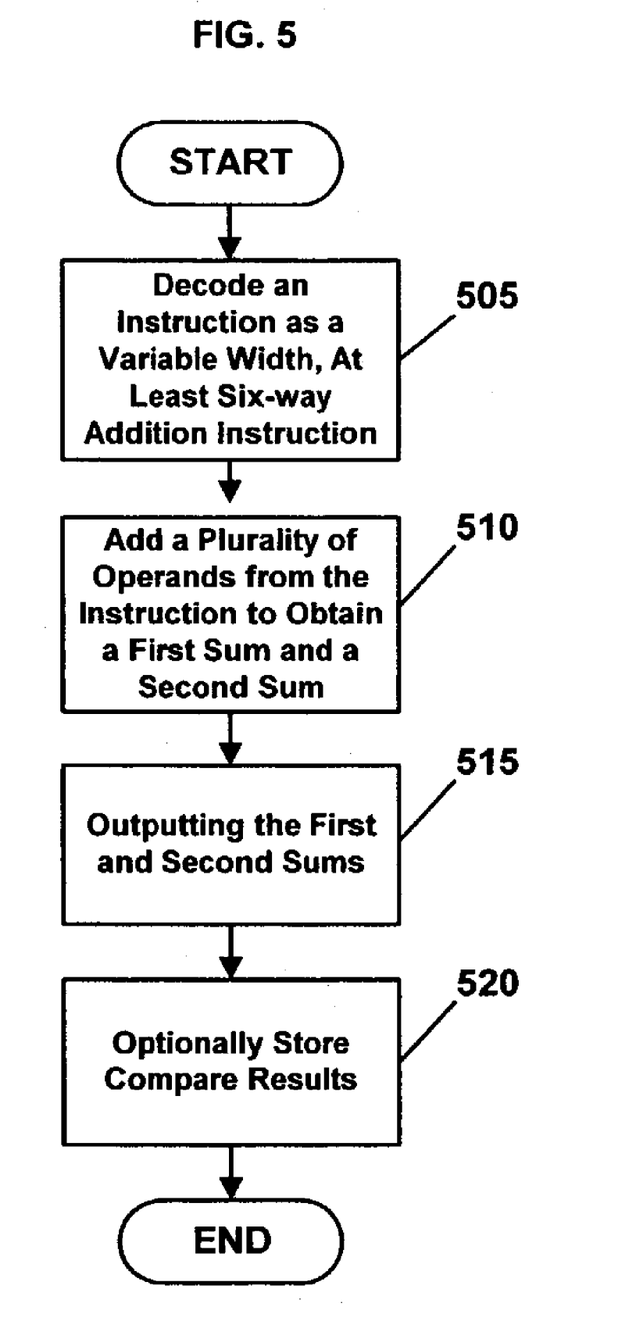
FIG. 5 is a top-level flow diagram of a method for providing a variable width, at least six-way (6-way) addition instruction in a processor, in accordance with an embodiment of the present invention.

FIG. 5 is a top-level flow diagram of a method for providing a variable width, at least six-way (6-way) addition instruction in a processor, in accordance with an embodiment of the present invention. In FIG. 5, an instruction may be decoded as a variable width at least 6-way addition instruction 505 in, for example, a decoder (not shown) in processor 110 in FIG. 2. In FIG. 5, a plurality of operands from the at least 6-way addition instruction may be added to obtain a plurality of sums 510 using, for example, adders 210, 212, 214, 216, 220, 222, 224 and 226 in FIG. 2. The plurality of sums may include at least a first sum and a second sum. In FIG. 5, the plurality of sums may be output 515 from, for example, two of adders 220, 222, 224 and 226 in FIG. 2. In FIG. 5, as an option, carryout bits may be stored 520, for example, in CRR0 230 or CRR1 235 of FIG. 2. Likewise, if the option is selected, the carryout bits also may be stored in other memories such as other registers, cache memory, flash memory and the like.

Figure 6:
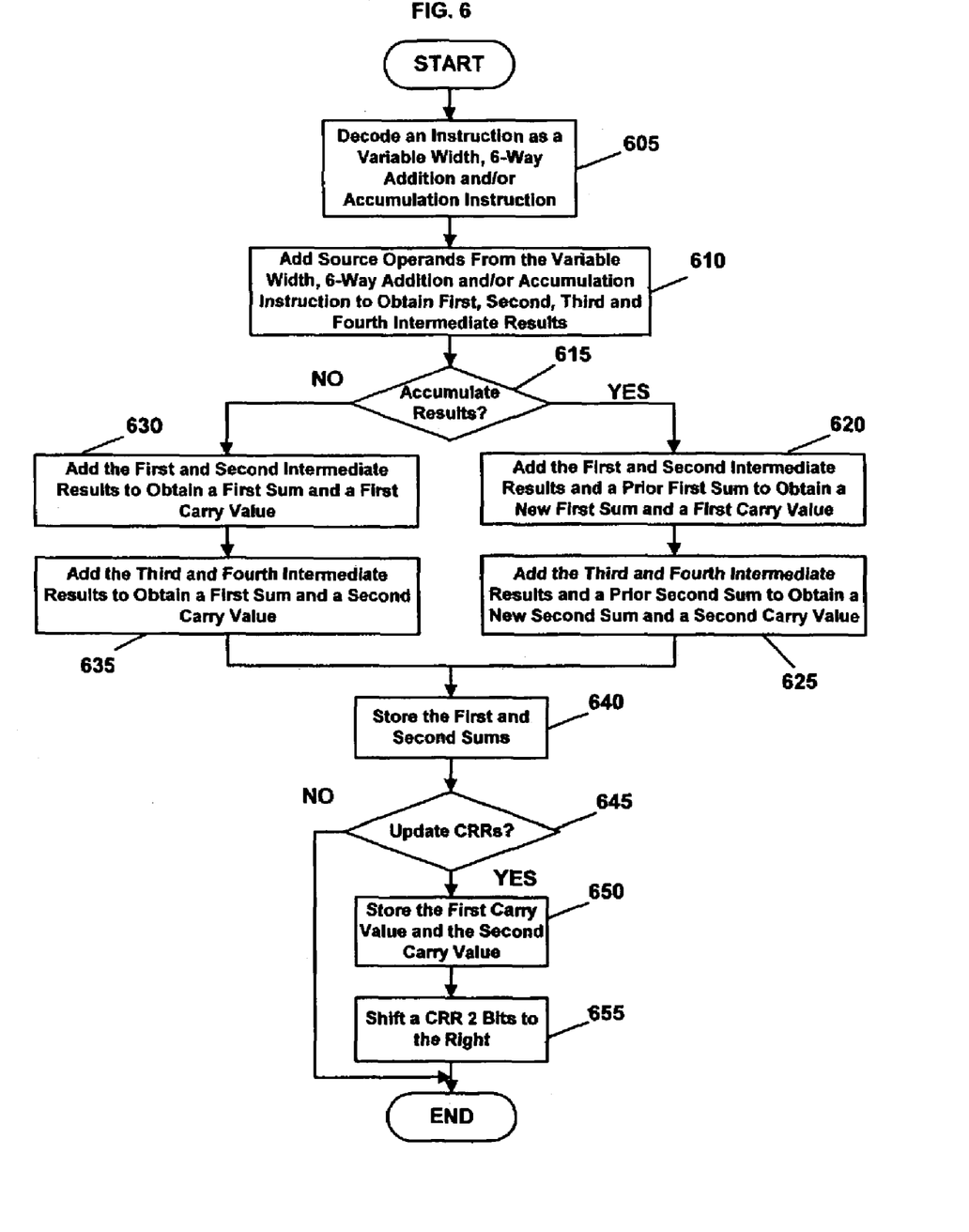
FIG. 6 is a detailed flow diagram of a method for providing a six-way (6-way) addition or accumulation instruction in a processor, in accordance with an embodiment of the present invention.

FIG. 6 is a detailed flow diagram of a method for providing a variable width, six-way (6-way) addition and/or accumulation instruction in a processor, in accordance with an embodiment of the present invention. In FIG. 6, an instruction may be decoded as a variable width, 6-way addition or accumulation instruction 605. Multiple operands, for example, multiple triplets of source operands, from the variable width, 6-way addition or accumulation instruction may be added 610 together to obtain a first intermediate result, a second intermediate result, a third intermediate result and a fourth intermediate result using, for example, the first, second, third and fourth adders 335, 340, 345 and 350 of FIG. 3. In FIG. 6, whether the results are to be accumulated may be determined 615 by checking for the presence of the "+=" operator or the acc option being set in the decoded instruction. If the results are to be accumulated 615, the first and second intermediate results and a prior first sum may be added 620 to obtain a first sum and a first carryout bit and the third and fourth intermediate results and a prior second sum may be added 625 to obtain a second sum and a second carryout bit. If the results are not to be accumulated 615, the first and second intermediate results may be added to obtain the first sum and the first carryout bit 630 and the third and fourth intermediate results may be added to obtain the second sum and the second carryout bit 635. The first and second sums may be output 640. Regardless of whether the results are accumulated, whether the carryout bits are to be updated may be determined 645 by checking for the presence of the CRR option being set in the decoded instruction. If the CRR is determined 645 to need to be updated, the first and second carryout bits may be stored 650 in a CRR, for example, CRR1 235, the CRR may be shifted 655 two (2) bits to the right, and the instruction execution may terminate. If the CRR is determined 645 not to need to be updated, the instruction execution may terminate.

Figure 7:
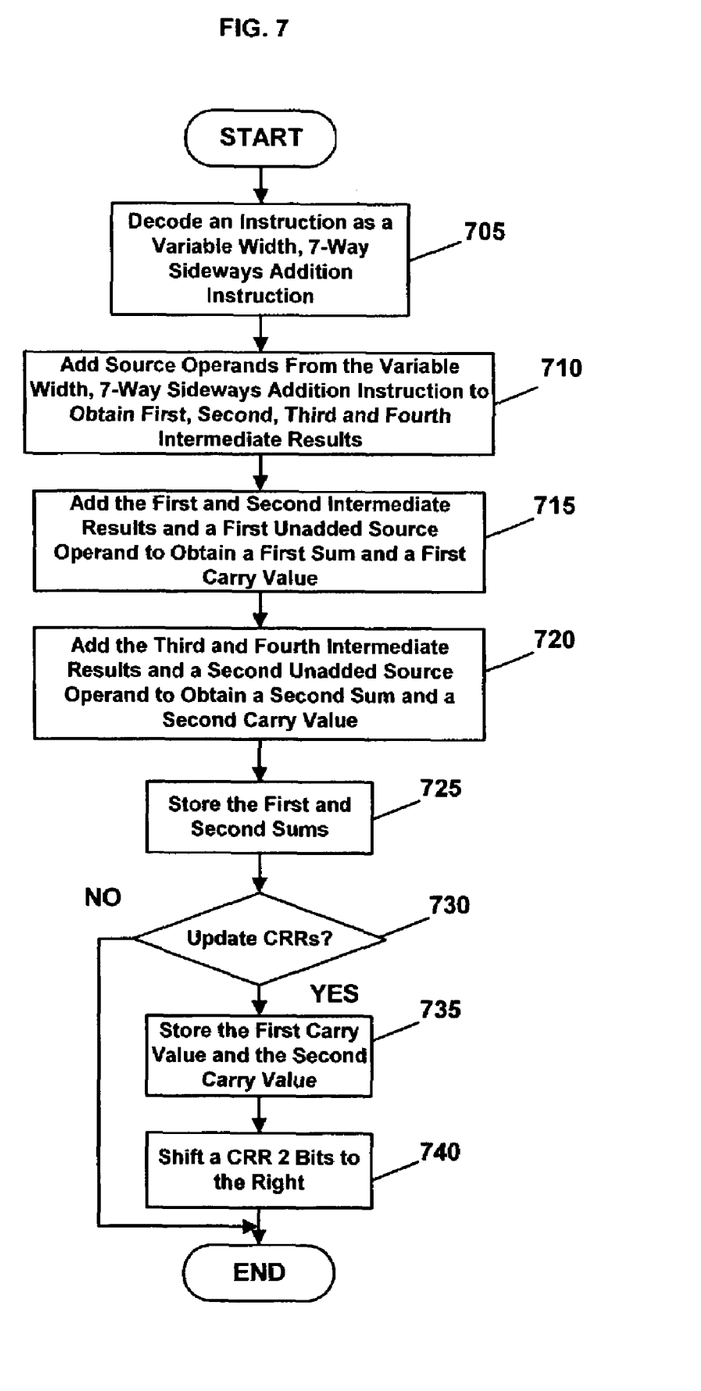
FIG. 7 is a detailed flow diagram of a method for providing a seven-way (7-way) sideways addition instruction in a processor, in accordance with an embodiment of the present invention.

FIG. 7 is a detailed flow diagram of a method for providing a variable width, seven-way (7-way) sideways addition instruction in a processor, in accordance with an embodiment of the present invention. In FIG. 7, an instruction may be decoded as a variable width, 7-way sideways addition instruction 705. Multiple operands, for example, multiple triplets of source operands, from the variable width, 7-way sideways addition instruction may be added 710 together to obtain a first intermediate result, a second intermediate result, a third intermediate result and a fourth intermediate result using, for example, the first, second, third and fourth adders 450, 455, 460 and 465 of FIG. 4. Returning to FIG. 7, the first and second intermediate results and a first un-added operand that may have been latched to storage location 440 from the plurality of operands may be added 715 to obtain the first sum and the first carryout bit. Similarly, the third and fourth intermediate results and a second un-added operand that may have been latched to storage location 445 from the plurality of operands may be added to obtain the second sum and the second carryout bit 720. The first and second sums may be output 725. Regardless of whether the results are accumulated, whether the carryout bits are to be updated may be determined 730 by checking for the presence of the CRR option being set in the decoded instruction. If the CRR is determined 730 to need to be updated, the first and second carryout bits may be stored 735 in a CRR, for example, CRR1 235, the CRR may be shifted 740 two (2) bits to the right, and the instruction execution may terminate. If the CRR is determined 730 not to need to be updated, the instruction execution may terminate.

In accordance with an embodiment of the present invention, a method for providing a variable width, at least six-way addition instruction in a processor includes decoding an instruction as a variable width, at least six-way addition instruction, the variable width, at least six-way addition instruction including a plurality of operands. The method further includes adding the plurality of operands to obtain a plurality of sums, and outputting the plurality of sums. The method may optionally include storing carry results from the adding operation.

In accordance with an embodiment of the present invention, a processor includes a decoder to decode an instruction as a variable width, at least six-way addition instruction, the variable width, at least six-way addition instruction having a plurality of operands; and a circuit coupled to the decoder. The circuit in response to the decoded variable width, at least six-way addition instruction to add the plurality of operands to obtain a plurality of sums; output the plurality of sums; and optionally store carry results from the adding operation.

In accordance with an embodiment of the present invention includes, a computer system having a processor and a machine-readable medium coupled to the processor in which is stored one or more instructions adapted to be executed by the processor to perform a method. The method including decoding an instruction as a variable width, at least six-way addition instruction, the variable width, at least six-way addition instruction including a plurality of operands. The method further including adding the plurality of operands to obtain a plurality of sums; outputting the plurality of sums; and optionally storing carry results from the adding operation.

In accordance with an embodiment of the present invention, a machine-readable medium in which is stored one or more instructions adapted to be executed by a processor to perform a method including decoding an instruction as a variable width, at least six-way addition instruction, the variable width, at least six-way addition instruction including a plurality of operands. The method further including adding the plurality of operands to obtain a plurality of sums; outputting the plurality of sums; and optionally storing carry results from the adding operation.

While the embodiments described above relate mainly to 32-bit data path and 32-bit register-based accumulatable and non-accumulatable addition instruction embodiments, they are not intended to limit the scope or coverage of the present invention. In fact, the method described above may be implemented with different sized data types and processing cores such as, but not limited to, for example, 8-bit, 16-bit, 32-bit and/or 64-bit data.

It should, of course, be understood that while the present invention has been described mainly in terms of microprocessor-based and multiple microprocessor-based personal computer systems, those skilled in the art will recognize that the principles of the invention, as discussed herein, may be used advantageously with alternative embodiments involving other integrated processor chips and computer systems. Accordingly, all such implementations, which fall within the spirit and scope of the appended claims, will be embraced by the principles of the present invention.

What is claimed is:

1. A processor comprising:
a decoder to decode an instruction as a variable width, at least six-way addition instruction, said variable width, at least six-way addition instruction including a plurality of operands; and
a circuit coupled to said decoder, said circuit comprises a plurality of 3:1 adders said circuit in response to said decoded variable width, at least six-way addition instruction to:
add said plurality of operands to obtain a plurality of sums;
output said plurality of sums; and
optionally store carry results from said adding operation.

2. The processor as defined in claim 1 wherein said plurality of 3:1 adders are configured to execute in at least one processor cycle.

3. The processor as defined in claim 1 wherein said circuit further comprises at least one compare result register.

4. The processor as defined in claim 1 wherein said plurality of 3:1 adders are arranged in two stages and configured to execute in two processor cycles.

5. The processor as defined in claim 4 wherein said circuit further comprises a compare result register for each processor cycle.

6. A computer system comprising:
  a processor said processor comprises:
  a decoder to decode an instruction as variable width, at least six-way addition instruction; and
  a circuit coupled to said decoder, said circuit to execute said decoded variable width, at least six-way addition instruction wherein said circuit comprises:
  a plurality of 3:1 adders; and
  at least one compare result register; and
  a machine-readable medium coupled to the processor, the machine-readable medium having stored thereon one or more executable instructions to perform the method comprising:
  decoding an instruction as a variable width, at least six-way addition instruction, said variable width, at least six-way addition instruction including a plurality of operands;
  adding said plurality of operands to obtain a plurality of sums;
  outputting said plurality of sums; and
  optionally storing carry results from said adding operation.

* * * * *